March 12, 1929.  O. A. GARBER  1,705,247
GRATE SHAKER
Filed May 6, 1927
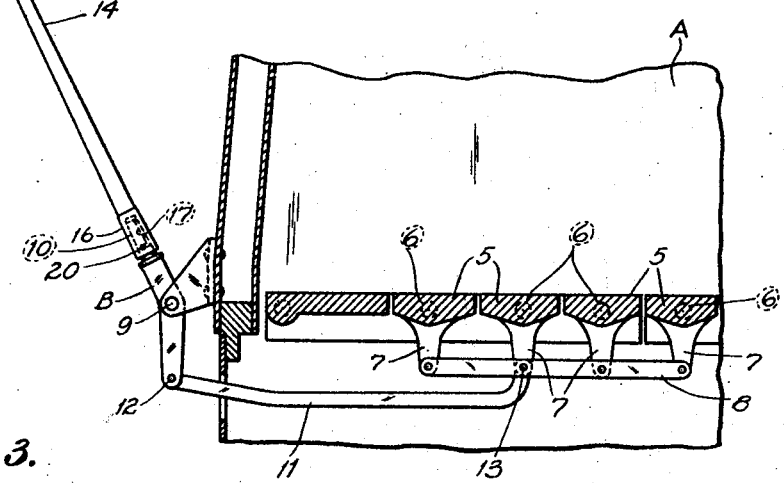
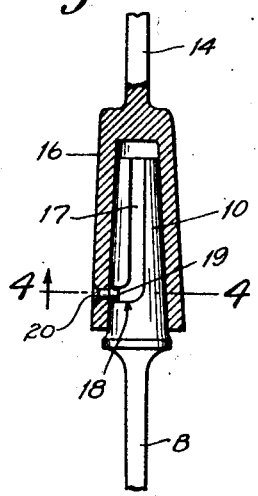
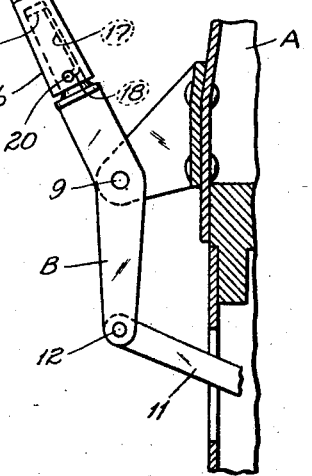
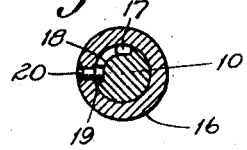
INVENTOR:
O. A. GARBER.
By Albert J. McCauley
ATTORNEY.

Patented Mar. 12, 1929.

1,705,247

UNITED STATES PATENT OFFICE.

OTIS A. GARBER, OF CLAYTON, MISSOURI.

GRATE SHAKER.

Application filed May 6, 1927. Serial No. 189,216.

This invention relates to a grate shaker including a handle adapted to interlock with a lever through which motion is transmitted to a grate.

Prior to this invention, locomotives have been equipped with grate shakers including operating handles detachably secured to operating levers by means of pins and other removable attaching devices. These old devices may be relied upon when they are properly secured to the handle and lever, but experience has shown that they are not always properly secured and in some instances the workmen fail to apply the attaching devices to the handles. As a consequence, the firemen using the shakers are subject to the danger of an accidental separation of the handles from the operating levers, and when this occurs on a rapidly moving locomotive, the fireman holding the handle is likely to fall into the tender, or to be thrown from the locomotive. Serious injuries have been caused by such accidental separation of the handles from the grate-operating levers.

Therefore, a object of the invention is to produce a grate shaker including an operating handle which cannot occupy its service position unless it is securely interlocked with the operating lever. I thus prevent accidental removal of the handle when it is in service.

Briefly stated, the handle and the grate-operating lever are provided with simple interlocking elements which co-operate with each other to firmly secure the handle when the latter is in its service position. However, the handle is detachable and it can be turned to an abnormal position for the purpose of releasing the interlocking elements, but owing to the peculiar arrangement of the several parts, the handle cannot be properly grasped to shake the grate when the interlocking elements are unlocked.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claim hereunto appended.

Fig. 1 is a vertical section showing a portion of a locomotive fire box equipped with a grate shaker embodying the features of this invention.

Fig. 2 is an enlarged fragmentary view showing a means for interlocking the handle with the grate-operating lever.

Fig. 3 is a view on a larger scale showing the interlocking elements.

Fig. 4 is a section on the line 4—4 in Fig. 3.

A designates a portion of a locomotive fire box equipped with grate members 5 each of said members being pivoted at 6 and provided with a downwardly extending arm 7. A bar 8 is pivotally connected to each of the arms 7. The grate-operating lever B is fulcrumed at 9 and provided with a tapering stem 10 at its upper end. A bar 11 is pivoted at 12 to the lower end of the lever B, and this bar is pivoted at 13 to the connecting bar 8.

The operating handle comprises a bar 14 inclined upwardly and forwardly from the stem 10. This bar 14 has a hand-receiving loop 15 extending forwardly from its upper end, and a tapering socket 16 at its lower end adapted to fit onto the tapering stem 10. This stem is provided with a longitudinal slot 17 extending downwardly from the upper end of the stem, said slot being open at its upper end and extended laterally at its lower end, as shown most clearly at 18 in Fig. 3. The lower portion of the socket 16 has an internal projection 19, which may be riveted to the socket as shown at 20, or secured thereto in any other suitable manner.

When the handle occupies its service position, the loop 15 extends forwardly as shown in Fig. 1, and the projection 19 then lies in the laterally extended lower end of the slot 17. In using the device, the operator grasps the straight portion 15' of the loop 15.

To separate the handle from the lever B it is necessary to turn the handle about one fourth of a revolution on the stem 10, so as to locate the projection 19 at the lower end of the longitudinal slot 17, and when the handle occupies this position its cannot be properly grasped to shake the grate.

The hand-receiving loop 15 is offset forwardly from the axis of the bar 14 and socket 16, so as to produce a crank-like operating member wherein the portion 15' is the hand-receiving member of the crank. This portion 15' is grasped and moved forwardly to lock the handle. In this connection, it is important to observe that the same portion 15' is also grasped and pulled forwardly to break up the fuel on the grate, and that this forward pull forcibly retains the locking projection 19 in its locked position.

I claim:

A grate shaker comprising a pivoted grate operating lever provided with an upwardly extending stem, and an upwardly extending handle bar on said stem and removably connected at its lower end thereto and by means of which said lever is rocked, said removable connection including a complementary socket and a stud extending into said socket with a bayonet joint fastening having a slot and a pin, said slot having one end for the entry of said pin and the opposite end closed, said handle bar having at its upper end a laterally projecting grip portion, said handle bar being adapted to be rocked in a vertical plane by pushing and pulling power applied to said grip portion, and said grip portion extending in such a direction with respect to said slot and pin that pulling power on said grip portion for the purpose of shaking a grate tends to urge said pin into the innermost end of its complementary slot, the grip portion being in its extreme forward position under the influence of pulling power when said pin is in its innermost position within the closed end of said slot.

In testimony that I claim the foregoing I hereunto affix my signature.

OTIS A. GARBER.